1,982,953

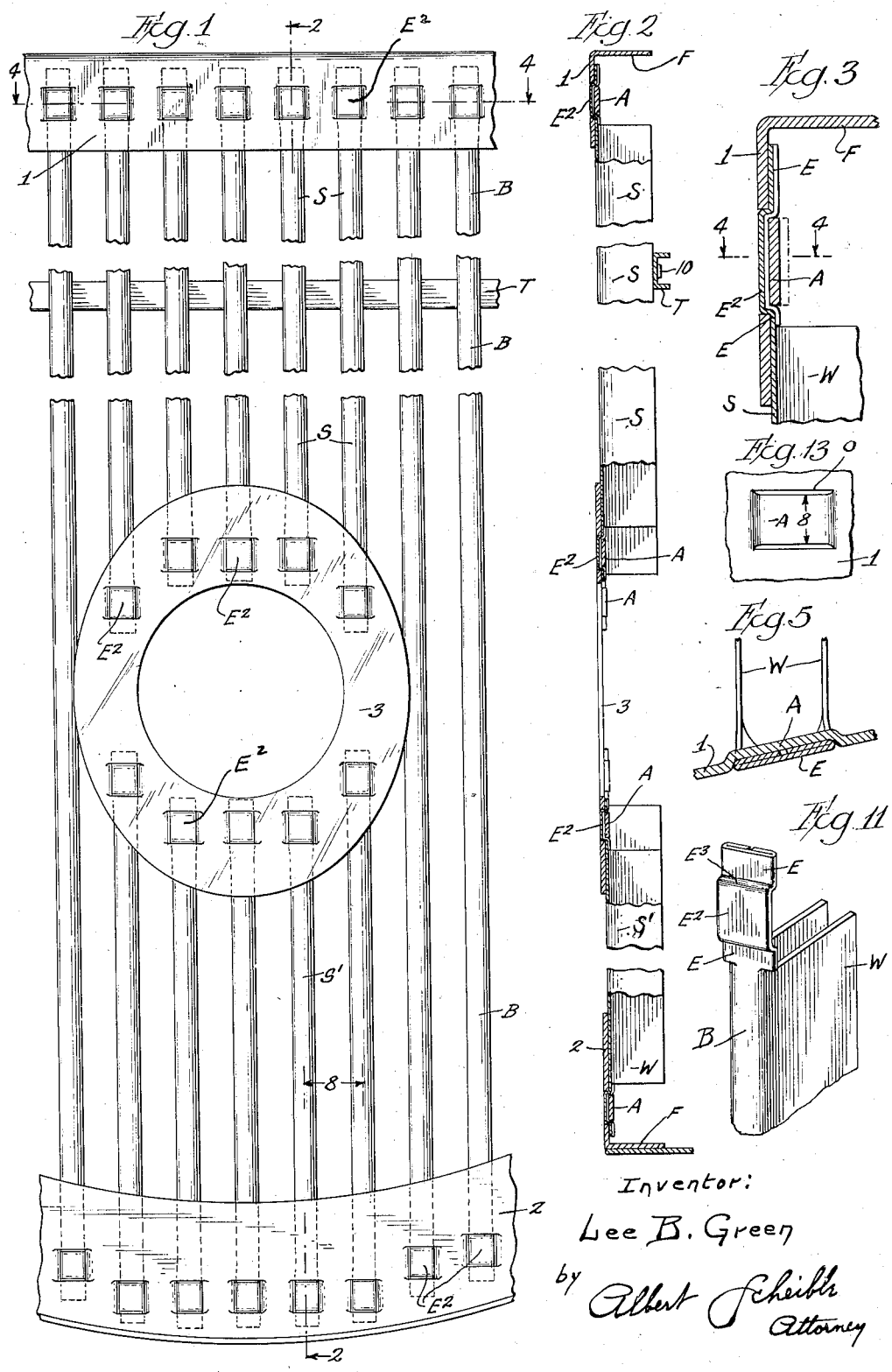
Dec. 4, 1934.  L. B. GREEN  1,982,953
PARALLEL BLADE RADIATOR GRILLE
Filed July 31, 1933   2 Sheets-Sheet 1
Inventor:
Lee B. Green
by Albert Scheible
Attorney Dec. 4, 1934.  L. B. GREEN  1,982,953
PARALLEL BLADE RADIATOR GRILLE
Filed July 31, 1933  2 Sheets-Sheet 2
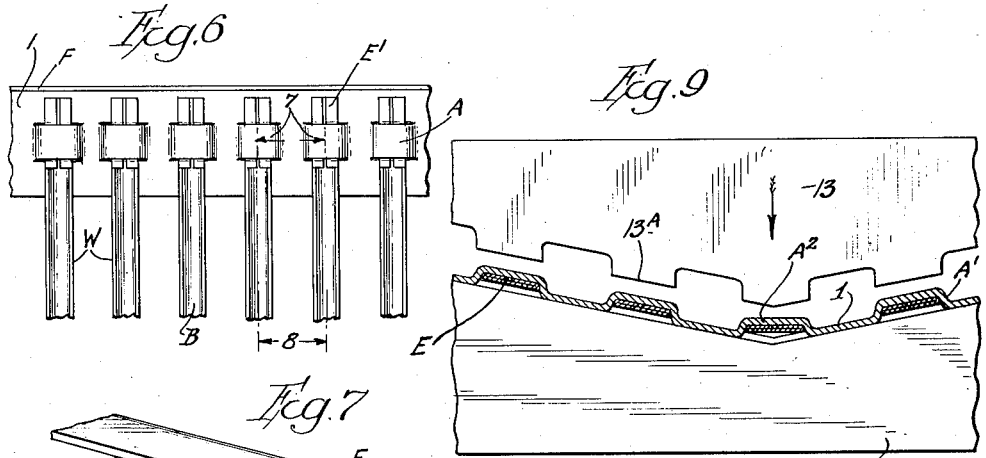
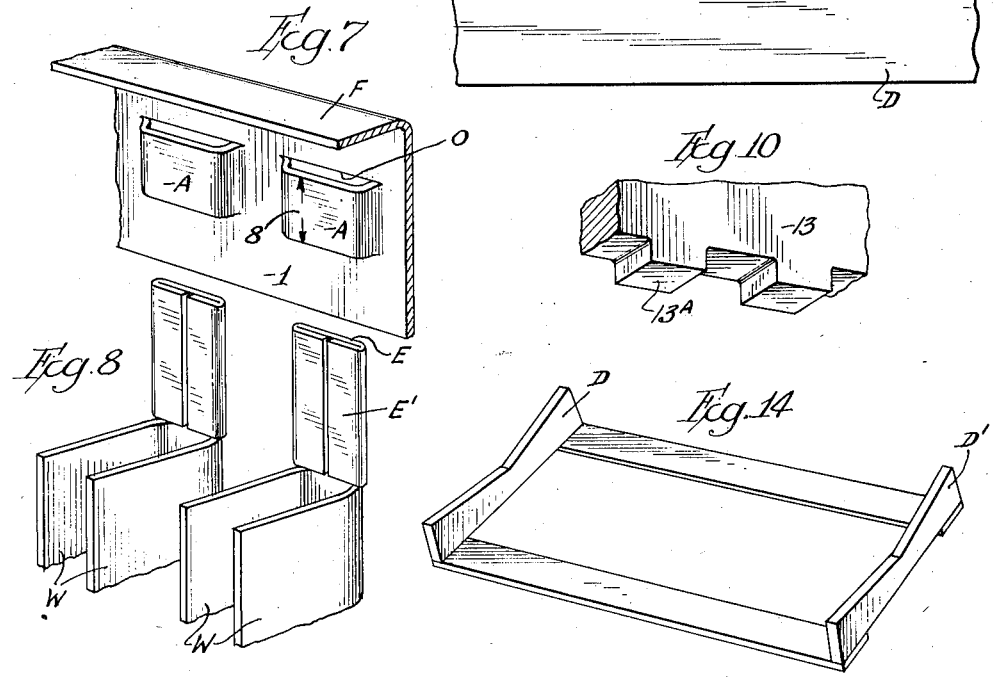
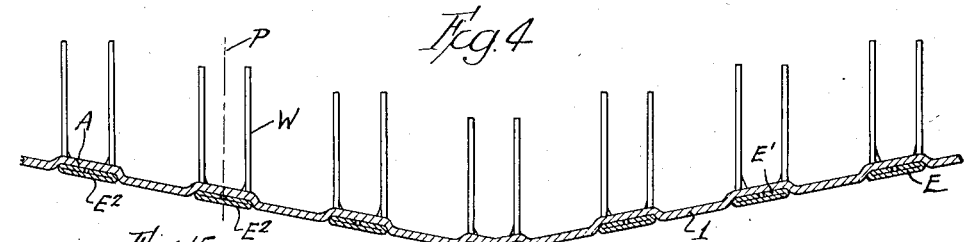
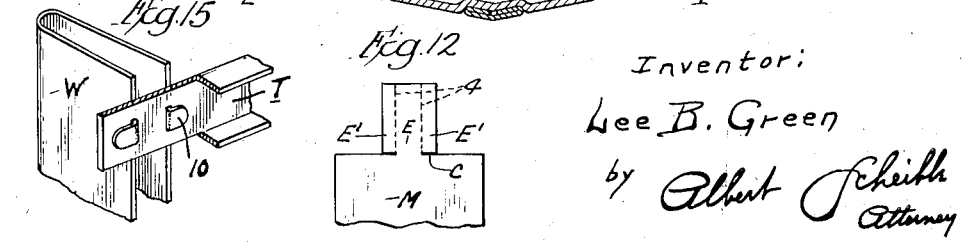
Inventor:
Lee B. Green
by Albert Scheible
Attorney Patented Dec. 4, 1934

UNITED STATES PATENT OFFICE 1,982,953

PARALLEL-BLADE RADIATOR GRILLE

Lee B. Green, Lakewood, Ohio

Application July 31, 1933, Serial No. 683,007

6 Claims. (Cl. 293—54)

My invention relates to grilles of the so-called parallel blade type, as now widely used for guarding the air-admitting frontal opening in the shell or other housing for the radiator front of an automobile, and more particularly to the providing of simple and inexpensive means for rigidly connecting the end portions of grille blades to end bars or other blade-connecting members.

Heretofore, such grille blades commonly have their end portions secured to upper and lower end bars by either riveting or spot-welding them to each of these bars, and the same fastening method has also been employed for securing the adjacent end portions of sectional blades to the perforated plate which is usually provided for admitting a hand crank.

While spot-welding has been found more economical than riveting for such fastenings, this still involves an undesirably high cost for the securing of the grille blades to the end bars of the grille and to the crank-admitting plate, since a separate operation is required for the fastening of each blade end to the adjacent blade-connecting member. Moreover, any single spot weld only spreads over a relatively small portion of the contact area between the blade and the member to which this blade is attached, so that the rigidity of the joint is not always ample to withstand severe strains on the blade; and unless the welding is quite carefully watched and inspected, inadequate welds may occur. Furthermore, elaborate jigs are often required for accurately holding the blades properly disposed with respect to the end bars until the welding operation is completed.

My present invention aims to overcome all of the above recited objections to previously customary grille constructions by constructing the blade-end portions and the end bars so that the blades and the end bars (or other blade-end connecting members) can initially be assembled by a mere sliding operation, and so that the blade-end portions can thereafter be rigidly interlocked with the end bars by simple punch-press operations.

For this purpose, my invention aims to provide grille-end bars with suitably spaced formations which will slidably admit the end portions of the several blades and which also will hold the blades in proper relation to the end bars prior to the said interlocking operations, and which (with most shapes of grilles) will permit each end bar to be slid with a single movement into such holding relation to all of the blades, thereby saving considerable assembly time and eliminating the need of a blade-spacing jig.

More particularly, my invention aims to provide each end bar with integral formations through each of which the end portion of a blade can be slid, and to construct these formations as well as the blade-end portions so that a simple punch-press operation will thereafter suffice for interlocking the blade-end portions and the end bar to secure joints of greater rigidity and dependability than those obtained by the fastening methods heretofore employed.

Furthermore, my invention aims to provide a suitable blade-end shaping which can easily be made without increasing the number of punch-press operations usually required for forming a grille blade of sheet metal, and which will readily permit the blade-end portions to be enhanced in rigidity even when the entire blade is formed from relatively thin metal and has its main portion of the now customary U-section.

So also, my invention aims to provide a grille blade construction, which will readily permit the medial plane of each blade to be disposed at any desired angle to the front face of the members to which the ends of the blade is fastened, which can be employed with equal facility regardless of variations in the lengths of different blades of the grille, and which will allow for such variations in the lengths of the blades and the spacing of the two grille-end members as may occur in commercial manufacturing practice.

In another major object, my invention aims to provide an unusually expeditious and inexpensive method of assembling a grille which includes two end bars spanned by grille blades, and which also includes a socalled "tie-bar" connecting the blades at approximately mid-height, which assembly method will also permit an expeditious fastening of certain sectional blades to a crank-admitting plate.

Illustrative of my invention and of more detailed objects of the same, Fig. 1 is a fragmentary front elevation of an upright V-front grille including continuous blades having their end portions fastened after the manner of my invention to angle-sectioned grille-end bars, and also including sectional blades each fastened at one end in the same manner to a crank-hole bordering plate.

Fig. 2 is a vertical section taken along the line 2—2 of Fig. 1.

Fig. 3 is an enlargement of the upper portion of Fig. 2.

Fig. 4 is an enlarged horizontal section taken along the line 4—4 of Fig. 1.

Fig. 5 is an enlargement of a portion of Fig. 4.

Fig. 6 is a fragmentary rear view of the upper portion of Fig. 1.

Fig. 7 is an enlarged rear perspective view of a part of the upper grille-end bar of Fig. 1, or that of Fig. 6, as initially formed.

Fig. 8 is a similarly enlarged rear perspective view of the upper portions of two grille blades before the flattened ends of these blades are slid through the arch formations on the end bar in Fig. 7.

Fig. 9 is a fragmentary vertical section through a die block on which an end bar for a grille is seated, after the corresponding blade ends have been slid through the arch formations in this end bar, and before the also illustrated die is depressed to interlock the blades with the end bar.

Fig. 10 is a fragmentary bottom perspective view of the die of Fig. 9.

Fig. 11 is an enlarged perspective view of the upper end of one of the grille blades, showing the deforming of the flattened part of this blade end by the punch press operation to which Figs. 9 and 10 relate.

Fig. 12 is an elevation of the end portion of the metal strip from which one of the illustrated blades was formed.

Fig. 13 is a rear elevation of a part of the end member shown in Fig. 7.

Fig. 14 is a diagrammatic perspective view of a die block suitable for assembling the here illustrated grille.

Fig. 15 is a rear perspective view showing the fastening of the blades to the tie-bar.

In the drawings, Fig. 1 shows portions of a V-front grille having upright blades B spanning an upper end bar 1 and a lower end bar 2, each of which blade-connecting bars is stiffened by a rearwardly extending flange F, which grille also includes shorter blades (S and $S^1$) each secured at one end to a crank-admitting perforated plate 3.

When the opening-spanning blade portions are to be of a U-section, each blade is desirably formed of a strip of steel which has all except its end portions of the desired U-section so as to afford flat parallel webs W (as shown in Fig. 8) and which has each such end portion flattened to present a forward flat face for engagement with the upright web (1 or 2) of the adjacent end bar.

To secure adequate strength and rigidity for each flattened blade end, I desirably start with a flat metal strip having each end portion narrower than its main portion M (Fig. 12) and having a shear cut C separating each lateral edge part of such an end portion from the said main strip portion so as to permit the lateral edge portions $E^1$ of each strip end to be bent toward each other (along the dotted lines 4) and into contact with the intermediate portions E of this strip end. By proceeding in this manner I double the thickness of each blade-end portion, and also provide this blade portion with semi-cylindrical longitudinal edges to avoid having sharp edges cut into the hereafter described arches on the blade-connecting members during the assembling of the grille.

For use with such flat blade-end portions, I provide each generally horizontal end bar (1 and 2) by simple punch-press operations with horizontally spaced and integral horizontally extending arches A all bowed rearwardly from the upright portion of that end bar. Each of these arches preferably has the forward face of all except its end portions flat and spaced rearwardly from the rear face end bar by a distance slightly greater than the thickness of a blade end, has its height considerably less than the length of such a blade end, and has its interior width corresponding approximately to the width of the blade end. I also provide the crank-admitting plate 3 with similarly formed horizontal arches, the horizontal center spacings 7 (Fig. 6) between the centers of adjacent arches in this plate and in both of the end members being equal to the desired spacing 8 of the medial planes P (Fig. 4) of the corresponding blades.

Each such arch A preferably has the width 8 (Fig. 7) of its opening-bridging portion or arch top somewhat less than the height of the opening O behind it; and each flat blade end is considerably longer than the said arch width 8, so that the blade end E, when slid through the arch, will have portions both above and below this arch bearing flatwise against the rear face of the member on which the arches are formed. Moreover, each end member preferably has its blade-engaging face of greater width (vertically) than the length of a flat blade tip, so that this face can also engage a portion of the U-back of the main blade portions, as shown in Fig. 6.

When the grille is to include the customary crank-admitting annular plate and also a blade-connecting tie-bar somewhere near the midheight of the grille, I proceed with its construction in the following manner:

First, I provide the end bars 1 and 2, and the perforated plate 3 with the arches A all bowed in the same direction, and with the above recited arch spacing, which can all be done speedily with groups of simple dies having rectangular punches.

Then I provide the needed long blades B, as also sectional blades S and $S^1$ in the desired lengths, for all of which blades both end portions can be formed with the same set of dies. Each of these blades also is desirably provided on both webs of its U-formation with rearwardly projecting tabs 10 adapted to extend through slots in the tie-bar T and then to be clinched over (as shown in Fig. 2) so as to fasten the blades to this tie-bar after the manner more fully disclosed in my United States Patent #1,914,253 of June 13, 1933.

Next, I slide the flattened lower end portion of the upper section S and the upper end portions of the lower section $S^1$ of each two-sectioned blade respectively through the upper and lower arches on the crank-admitting plate 3. Then I deform each of these arches by compressing it flatwise so as to force the blade-end portion under that arch into the opening O (Figs. 7 and 13) behind that arch, which opening was left by forming the arch out of the corresponding part of the plate 3, thereby rigidly anchoring each such blade end to this plate.

After thus anchoring one end of each of the shorter or sectional blades S and $S^1$ to the plate 3, I connect all of the blades to the tie-bar T by clinching the tabs 10 on these blades of the said bar, as illustrated in Fig. 15, and more fully described in my Patent #1,914,253. When thus fastened to this tie-bar, the two tabs on each blade not only prevent the blade from shifting (longitudinally of the blade) with respect to the tie-bar, but also rigidly space the blades and hold these blades in the desired substantially parallel relation in which the end portions of the blades are in relative positions corresponding to those of the arches A on the upper and lower end members 1 and 2.

This assembly of all of the blades with the crank-admitting plate 3 and the tie-bar T can then be handled as a unit which readily permits the upper and lower end members to be slid respectively over the free ends of all of the blades, so that the blade-end portions extend respectively through the arches on these end members, as shown in Fig. 6 in connection with a part of the upper end member.

After the blades have thus been slidably attached to the end members, the resulting assemblage can then be set, front face downward, on a die-block assemblage such as that shown diagrammatically in Fig. 14, with the end members of the grille seated respectively on the die blocks D and D¹, one of which die blocks is shown in enlarged and fragmentary elevation in Fig. 9. Then a single depressing movement of the corresponding punch 13 suffices for compressing all of the arches A on the end member under it, and also for indenting the blade-end portions E² under these arches into the apertures out of which the material for the arches was formed. For this purpose, I desirably construct the punch 13 with projecting lower end portions 13 A corresponding substantially in area to the outer faces of the arches and having their tip faces parallel to the face portions of the die block D which are respectively opposite these projection faces.

During this punch-press operation, the riser ends A¹ of the arches are compressed, the back of each arch is moved from the dotted line to the full line position shown at A in Fig. 3, and the part E² of the blade end below each arch is offset downwardly from the adjacent portions E of this blade end (as shown in Fig. 11) so as to indent it into the opening O (Fig. 7) behind that arch. If the blade-end were initially of a sharp angled rectangular section, its sharp edges might dig into and weaken the arch during this punching operation, but I avoid this by providing each blade-end portion with semi-cylindrical lateral edges as heretofore described and as shown in Fig. 8.

If the blades are formed of fairly thick metal—as shown to an exaggerated extent in Fig. 3 to clarify the drawings, I may also make the transverse width 8 of each arch (Figs. 7 or 13) less than the height or corresponding dimension of the opening O behind the arch, so as to afford room for the offsetting portions E³ which connect the offset part E² in the deformed blade-end portion with the portions E above and below this offset part, as shown in Figs. 3 and 11. Consequently, with a suitable proportioning of the parts, I not only avoid any shearing or overstraining of the blade-end portions, but also cause the indented blade-end portion to fit tightly against all four walls of the opening O, thereby securing unusual rigidity for the resulting fastening. This rigidity is further enhanced when the (vertical) width of the blade-engaging part (1 or 2) of each end member is considerably greater than the length of a flat blade tip, so that a portion of the U back of each blade will also bear against this end member, as shown in Figs. 2 and 6.

Since the initially flat blade end portion, as shown in Fig. 8, can be formed so as to present its flat faces either at right angles or at any desired oblique angle to the medial plane P (Fig. 4) between the webs of each blade, I can readily adapt my construction to grilles of any desired V-front angle, or generally rounded front. And since each end member is slipped separately over the set of blade ends adjacent to it, the arches in the lower end member need not aline with those of the upper end member. So also, since ample clearance can be permitted between each blade tip and the adjacent flange F on the corresponding end member, my grille construction allows for such variations in manufacture as may occur in ordinary practice.

Moreover, while I have here pictured and described an embodiment of my invention in which the main portions of the blades are of a rearwardly open U-section, the cross-sectional shape of the main portions of the blades is immaterial so long as their end portions fit the formations through which they are to be slid. Hence I do not wish to be limited to these or other details of the construction and arrangement here disclosed, it being obvious that many changes might be made without departing either from the spirit of my invention or from the appended claims.

I claim as my invention:

1. An upright grille comprising two generally horizontal upper and lower end members having upright rear faces; and a plurality of generally upright blades spanning the said end members; each end member including horizontally spaced, horizontally extending and rearwardly bowed integral arches; each blade having its end portions extending respectively through and beyond an arch on the upper end member and an arch on the lower member; the part of each blade between each blade-end portion being of a rearwardly open U-section and the said blade part having portions of its U-back bearing against the said upper and lower members.

2. A grille blade formed from a strip of sheet metal, comprising a main blade portion of rearwardly open U-shaped section, and two flat end portions each presenting its forward face in a plane approximately at right angles to a plane medial of and parallel to the shanks of the U-section of the main blade portion, the longitudinal edge faces of each flat end portion being semicylindrical.

3. A grille blade formed from a strip of sheet metal, comprising a main blade portion of rearwardly open U-shaped section, and two flat end portions each presenting its forward face in a plane approximately at right angles to a plane medial of and parallel to the shanks of the U-section of the main blade portion, each flat end portion comprising a medial part and two relatively narrower webs folded over against the back of the said medial part.

4. A grille comprising upper and lower end bars each having horizontally spaced arches bowed rearwardly from it; a perforated crank-admitting plate having an upper and a lower row of similarly spaced arches bowed rearwardly from it; long blades extending respectively at opposite sides of the said perforated plate and each having its ends extending respectively through an arch in the upper end plate and an arch in the lower end plate; an upper set of short blades each having its ends extending respectively through an arch in the upper end plate and one of the upper arches on the perforated plate; and a lower set of short blades each having its ends extending respectively through one of the lower arches on the perforated plate and an arch on the lower end plate.

5. A grille as per claim 4, including a tie-bar extending above the said perforated plate and secured both to the short blades of the upper set and to the said long blades; the said tie bar together with the perforated plate and all of the blades constituting a substantially rigid unit prior to the attaching of the end bars to the longer blades.

6. An upright grille comprising spaced and substantially coparallel upright blades each having its major portion of a rearwardly open channel section and having flat end portions of less thickness than the width of the channel webs of the said major portion, each such end portion presenting its flat faces in upright planes at right angles to the medial plane between the two channel webs of the major portion of the same blade; and end members each presenting flat upright face portions in engagement with a flat face of an end portion of each blade; each end member being formed to present arches respectively bowed over the blade end portions engaging that end member.

LEE B. GREEN.